3,304,908
EPITAXIAL REACTOR INCLUDING MASK-WORK SUPPORT
Heinrich Gutsche and John P. Yorkovich, Danville, Pa., assignors to Merck & Co., Inc., Rahway, N.J., a corporation of New Jersey
Filed Aug. 14, 1963, Ser. No. 302,061
2 Claims. (Cl. 118—49.5)

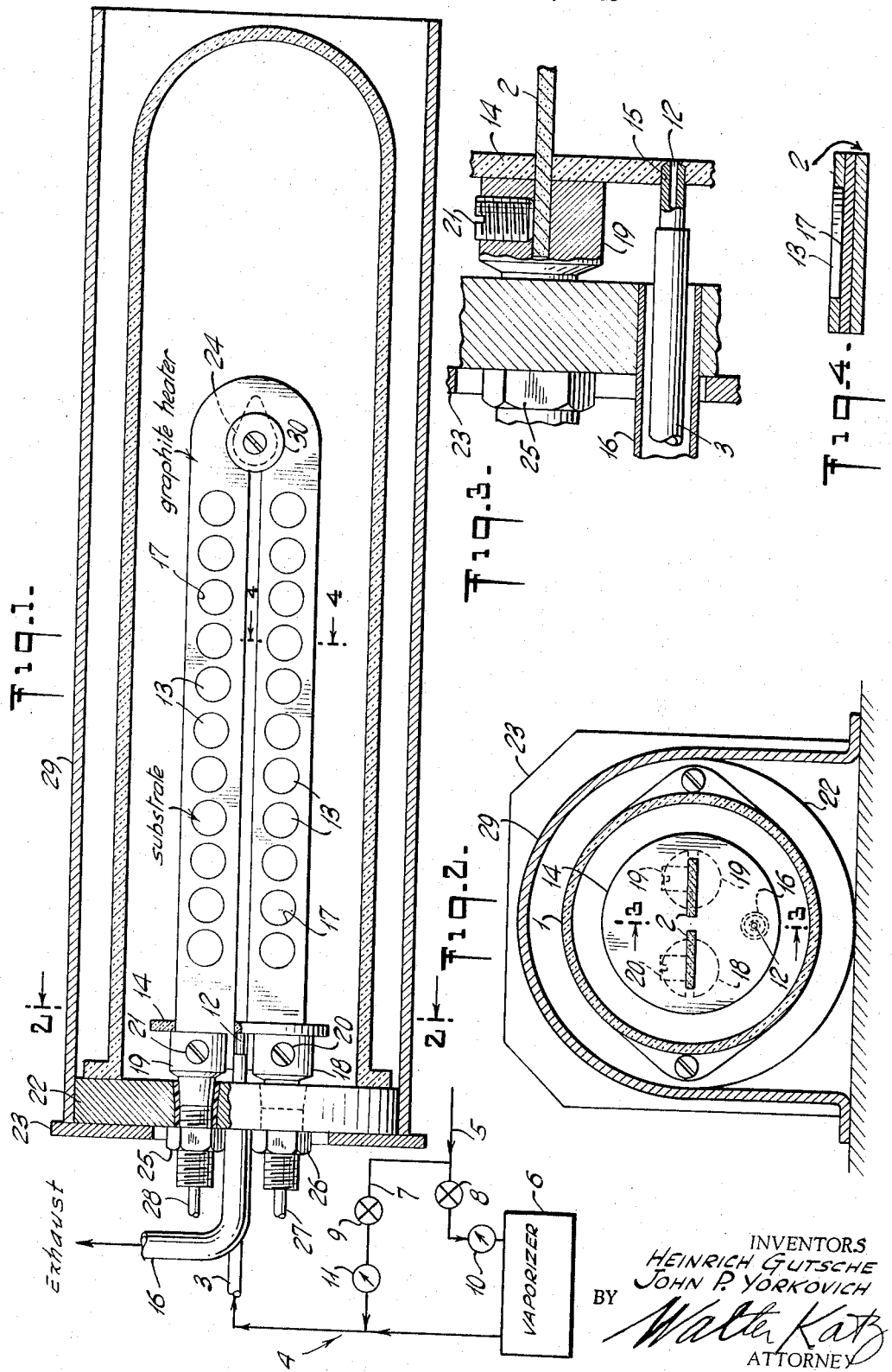

This invention relates to an epitaxial reactor system, and more particularly, it is concerned with an apparatus for producing epitaxial layers by deposition from the vapor phase.

The process of growth of semiconductor layers from the vapor phase is well known in the art. Several different forms of reactor design have been utilized in the past for producing epitaxial layers by this technique. While this equipment has generally served to produce layers of high crystalline perfection, the epitaxial deposit has been notably deficient in one or more physical parameters. Particularly, the uniformity of the layer thickness has been poor within a given wafer and the wafer-to-wafer thickness has been variable.

Accordingly, it is an object of the present invention to provide an improved apparatus for deposition of epitaxial bodies from the vapor phase.

Another object of the instant invention is to provide an epitaxial reactor system which is capable of forming uniform epitaxial layers.

A feature of the invention is the provision of an epitaxial reactor system in which a gas inlet tube is positioned below the plane of the semiconductor substrate wafers.

Still another feature of the instant invention is the provision of a mask for the substrate wafers of suitable dimensions built up of silicon on a silicon carbide base on a graphite heater support.

A further feature of the instant invention is the provision of a substantially horizontal reactor support within the reactor apparatus.

Another feature of this invention is the provision of means for maintaining the support in a nearly horizontal position.

Among the other features of the instant invention is the utilization of an outlet tube which is substantially concentric with the inlet tube.

Yet another feature of the invention is the provision of predetermined and suitable dimensions of various structural portions of a reactor assembly to provide a more nearly uniform epitaxial deposit on the substrate.

Still a further feature of this invention is the utilization of a substrate wafer of predetermined thickness for deposition on a substrate element.

These and other objects and features of the invention will be made apparent from the following more particular description of the invention in which reference will be made to the accompanying drawings in which:

FIGURE 1 is a schematic illustration in longitudinal top section showing the reactor assembly of the present invention.

FIGURE 2 is a cross-section taken along lines 2—2 of the assembly shown in FIGURE 1.

FIGURE 3 is a detailed drawing in section of the inlet and outlet tubes of the assembly taken along lines 3—3 of FIGURE 2.

FIGURE 4 shows the position of the semiconductor wafers on the coated support member, taken along lines 4—4 of FIGURE 1.

The semiconductor substrate may consist of silicon, germanium, silicon carbide and various Group III–V compounds such as gallium arsenide, indium antiminide, gallium phosphide and the like and solid solutions thereof.

In accordance with the present invention there is provided an improved epitaxial reactor system for producing epitaxial layers of semiconductor material by deposition from the vapor phase. Referring now to FIGURES 1–3, the apparatus includes generally a bell-shaped substantially horizontally positioned reactor vessel 1 made of a high temperature resistant material, such as quartz. Within the reactor is a support element 2, preferably of graphite, although silicon, tungsten or molybdenum may be used as well.

An inlet tube 3 is positioned below the plane of the support element 2 for admitting reactant gases into the reactor chamber.

The semiconductor bodies are formed herein from a decomposable vapor source of the semiconductor material. The terms "thermally decomposable," "thermal decomposition," and the associated deposit of a product of decomposition, as used herein, are intended to be generic to the mechanisms of heat-cracking as, for example, the decomposition of silicon tetrachloride and liberation of silicon atoms through the action of heat alone and the mechanism of high temperature reactions wherein the high temperature causes interaction between various materials with liberation of specific materials or atoms as, for example, the reaction of

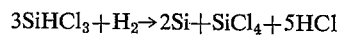

$$3SiHCl_3 + H_2 \rightarrow 2Si + SiCl_4 + 5HCl$$

used in the preferred embodiment of this invention as hereinafter indicated. For the sake of illustration, the following detailed description of apparatus used and product obtained relates to the use of the invention in the formation of single crystal silicon semiconductor bodies.

Referring particularly to FIGURE 1 there is shown a reactant stream, generally referred to as 4, for admitting the reactant gases into the reactor assembly. This stream consists of a hydrogen gas flow 5 which is divided into two portions, one which passes over liquid silicochloroform in vaporizer 6 and the other which acts as a diluent for the process gas, indicated as flow 7. The desired mole ratio and flow rate of silicochloroform and hydrogen is adjusted by needle valves 8 and 9, respectively, and indicated by gas flow meters 10 and 11.

The combined process gas streams enter the reactor through an inlet nozzle 12 of inlet tube 3 and passes underneath the support 2 whereupon it encounters a plurality of heated semiconductor substrate wafers 13 which are positioned in the support. At the temperature of the substrate, reaction occurs between the silicochloroform and hydrogen and silicon is deposited on the substrate wafers. The reaction temperature is generally about 1200°C. as measured by an optical pyrometer.

The reactant gases enter the reaction chamber through a nozzle 12 having a 2 mm. diameter hole. The nozzle is secured to the gas inlet tube. Quartz plate 14 is placed against the electrodes to shield them from excessive heat. An aperture 15 in quartz plate 14 permits the nozzle to pass through. The inlet pipe is positioned on the vertical center line on the base plate about 1½″ from the heater. The distance from the surface of the base plate to the tip of the nozzle is about 1¼″.

The exhaust gases leave the reaction chamber through outlet tube 16 which is concentrically arranged about the inlet tube.

The substrate wafers 13 are placed in holes 17 in the support 2. The support is fastened to electrodes 18 and 19 by means of graphite screws 20 and 21. The electrodes are connected to a source of current (not shown) to heat the support electrically. The electrodes are mounted in a metal base plate 22 which is attached to a metal support 23. The support is held in a substantially horizontal position at the end thereof by means of a graphite block 24.

The centers of the electrodes are spaced about 2″ apart on the horizontal center line of the metal base plate by means of lock nuts 25 and 26. The electrodes are then insulated in the metal base plate by Teflon inserts and then connected to the power source by leads 27 and 28. The end of the electrode which is enclosed in the reaction chamber is slotted in the middle and has a threaded hole through one half of the diameter. The graphite heater passes through a slot in the quartz plate which is then supported by the top edge of the slot resting on the heater.

Metal support 23 for the reaction chamber is mounted on a metal table which is generally about three feet high and 2½ by 2 feet square. A reactor shield 29 having aluminum on the inside is placed over the quartz chamber for safety protection and heat reflection. The metal base plate is constructed of high purity silver and is cooled by water circulation in the plate.

The graphite heater is about 16″ long and 2¾″ wide with a ¼″ slot through the middle. At the closed end of the heater is a graphite cooling button 30 which is fastened to a tear-drop shaped heater support by means of a graphite screw. The cooling button prevents a high concentration of electrical current at the small inside edge of the heater bend. The heater support is about 3″ long and serves to support the heater in a predetermined substantially horizontal position. It is tear-drop shaped to provide for the proper aerodynamic flow of gases in the reaction chamber.

Referring to FIGURE 4, a mask for the substrate wafers is prepared by first coating a graphite heater with an inert material. Alternatively the mask may be formed by providing a hole in the graphite heater whereupon the graphite itself is the mask. In a preferred embodiment wherein silicon substrate wafers are employed, a graphite heater is coated first with a layer of silicon carbide. Then dummy silicon wafers are placed on the silicon carbide, layered graphite heater and an additional layer of 10 mils of silicon is deposited thereon. Then the dummy substrates are removed to provide a mask of silicon on silicon carbide for the epitaxial deposition on other silicon substrates.

In a typical run, a graphite heater is first treated at 1350° C. for 30 minutes with a hydrogen purge at a flow rate of 40 l./min. at 70° F. and one atmosphere. Then the heater is coated with 2–3 mils of silicon carbide at 1350° C. by vapor depositing SiC from a gas mixture of methyltrichlorosilane and hydrogen. The mol ratio of the reactant gases is 0.1 mol of methyltrichlorosilane to 1 mol of hydrogen. The total hydrogen flow rate is 30 l./min. at 70° F. and one atmosphere. The deposition time is approximately 15 minutes.

Then dummy substrates of the exact same dimensions as those intended for use later is placed on the silicon carbide coated graphite heater surface. Finally a 10 mil silicon coating is deposited on the heater and dummy substrates at 1150° C. by vapor depositing silicon from a gas mixture of trichlorosilane and hydrogen, the mol ratio being 0.008 mol of trichlorosilane to one mol of hydrogen; the hydrogen flow rate is 51 l./min. at 70° F. and one atmosphere and the deposition time is approximately 120 minutes. The thickness of the silicon coating in this step is thereupon made substantially the same as the thickness of the wafer substrates themselves. The resultant structure prior to epitaxial deposition in shown in FIGURE 4.

While the invention has been described with particular references to certain preferred embodiments thereof, it will be understood that equivalent structures may be used as well.

What is claimed is:

1. An epitaxial reactor system for depositing uniform epitaxial silicon layers from the vapor phase onto silicon substrate wafers which comprises:
  (a) a horizontal reactor chamber,
  (b) an elongated graphite support generally horizontally positioned in said reactor for said substrate wafers having a silicon carbide layer thereon with a silicon overlayer on said silicon carbide layer except where the silicon substrate wafers are to be placed when in operation, said silicon layer being substantially of the same thickness as said substrate wafers,
  (c) means for maintaining said support in said position,
  (d) electric means for heating said support thereby to heat said wafers from heat from said support to a reaction temperature,
  (e) a nozzle for admitting reactant gases into said chamber below the level of said support so as to pass said gases around said support, and
  (f) an outlet tube substantially concentric with the inlet tube through which the exit gases can pass.

2. Apparatus for producing epitaxial growth layers by deposition from vapor phase with monocrystalline growth on monocrystalline semiconductor substrate wafers which comprises: a horizontal tubular reactor chamber closed at one end, an elongated graphite support horizontally positioned within said horizontal tubular reactor, a coating of silicon carbide on said graphite support and an integral layer of silicon on said silicon carbide coating, the top of said silicon layer having apertures therein corresponding to the size of the substrate wafers to be inserted therein, said silicon layer being of approximately the same thickness of said substrate wafers, said carrier serving as a heater for the substrate wafers and equipped with supply leads whereby said carrier is heated and accordingfily the substrate wafers, an inlet nozzle to the reactor for introducing reaction gas, said nozzle being positioned below said carrier so that reaction gas flows around said carrier and an outlet nozzle for residue gases concentric with said inlet nozzle.

References Cited by the Examiner

UNITED STATES PATENTS

| | | | |
|---|---|---|---|
| 2,828,225 | 3/1958 | Goetzel et al. | |
| 3,098,763 | 7/1963 | Deal et al. | 117—119 |
| 3,131,098 | 4/1964 | Krsek et al. | 148—175 |
| 3,151,006 | 9/1964 | Grabmaier et al. | 148—174 |
| 3,152,933 | 10/1964 | Reuschel | 118—49.5 X |
| 3,184,348 | 5/1965 | Marinace | 148—174 |
| 3,220,380 | 11/1965 | Schaarschmidt | 118—48 |

MORRIS KAPLAN, *Primary Examiner.*